(12) United States Patent
Chen

(10) Patent No.: US 7,760,083 B2
(45) Date of Patent: Jul. 20, 2010

(54) BURGLARPROOF APPARATUS FOR AN ELECTRONIC MACHINE

(75) Inventor: Wen-Chi Chen, Jung-Ho (TW)

(73) Assignee: Micro-Star International Co., Ltd., Jung-Ho, Taipei Hsien (TW)

( * ) Notice: Subject to any disclaimer, the term of this patent is extended or adjusted under 35 U.S.C. 154(b) by 323 days.

(21) Appl. No.: 11/782,261

(22) Filed: Jul. 24, 2007

(65) Prior Publication Data
US 2009/0027201 A1 Jan. 29, 2009

(51) Int. Cl.
*G08B 1/08* (2006.01)
(52) U.S. Cl. .............. 340/539.26; 340/568.4
(58) Field of Classification Search ......... 340/539.26, 340/568.1, 568.3, 568.4
See application file for complete search history.

(56) References Cited

U.S. PATENT DOCUMENTS 3,765,008 A * 10/1973 Lowry ............... 340/568.3
3,781,857 A * 12/1973 Stendig et al. ........ 340/568.4
3,972,039 A * 7/1976 Marshall ............ 340/568.4
5,142,269 A * 8/1992 Mueller ............. 340/568.4
5,726,627 A * 3/1998 Kane et al. ........... 340/531
5,767,771 A * 6/1998 Lamont ............. 340/568.3
6,021,493 A * 2/2000 Cromer et al. ....... 340/568.1
6,026,492 A * 2/2000 Cromer et al. ....... 340/568.4
6,836,214 B2 * 12/2004 Choi ................ 340/568.3

* cited by examiner

*Primary Examiner*—John A Tweel, Jr.

(57) ABSTRACT

A burglarproof apparatus, which is built in an electronic machine with a communication connecting port being electrically connected to an end of a communication cable and another end of the communication cable being connected to a communication device, includes a detect unit, a controller and a warning component. The detect unit is connected to the communication connecting port via the communication cable for detecting if a communication signal, which is output by the communication device, is available at the communication connecting port and outputting a trigger signal in case of the communication signal being not provided. The controller is connected to the detect unit to receive the trigger signal and control the warning component to perform an action.

11 Claims, 8 Drawing Sheets

BURGLARPROOF APPARATUS FOR AN ELECTRONIC MACHINE

BACKGROUND OF THE INVENTION

1. Field of the Invention

The present invention is related to a burglarproof apparatus and particularly to a burglarproof apparatus for an electronic machine.

2. Brief Description of the Related Art

The conventional portable electronic machine such as the laptop computer has been very popularly satisfied by the users due to being capable of carried about conveniently. However, the portable electronic machine is often being stolen easily and the owner of the electronic machine has to keep an eye on it for preventing from burglary. As a result, it becomes an invisible burden to the user spiritually.

Taiwan Patent Application No. 094203560 entitled "ANTI-BURGLARIOUS POWER SUPPLY DEVICE" discloses an anti-burglarious power supplier, which includes a power supply device and an adapter. The power supply device has a case with an alternate current input receptacle and a direct current output plug. Further, a rectifier circuit, a voltage stabilizer circuit, a battery and a warning circuit are provided between the alternate current input receptacle and the direct current output plug. The warning circuit further includes an alarm and two circuit break detectors. One of the circuit break detectors is connected to the rectifier circuit for detecting if the input power is interrupted. The other circuit break detector is connected to a USB connector. The input end of an OR gate is connected to output ends of the two detectors and the output end of the OR gate is connected to the alarm. The input end of an AND gate is connected to the output ends of the two detectors and the output end of the AND gate is connected to the alarm too. Once the alternate input power or the power at the USB connector is disappeared, the alarm is activated.

The preceding anti-burglarious power supply device taught in Taiwan Patent Application No. 094203560 has to coordinate with a specific power supply device in order to perform the burglarproof function well. Normally, the power supply device provides a huge size and it is inconvenient for being carried about. Therefore, it results in the user is unwilling to take the power supply device at the time of being away and the burglarproof function becomes useless.

SUMMARY OF THE INVENTION

In order to overcome the preceding deficiencies, an object of the present invention is to provide a burglarproof apparatus for an electronic machine with which the burglarious behavior can be threatened effectively to prevent the electronic machine from being stolen.

Accordingly, a burglarproof apparatus according to the present invention is provided to be built in an electronic machine with a communication connecting port being electrically connected to an end of a communication cable and another end of the communication cable being connected to a communication device. The burglarproof apparatus includes a detect unit, a controller and a warning component. The detect unit is connected to the communication connecting port via the communication cable for detecting if a communication signal, which is output by the communication device, is available at the communication connecting port and outputting a trigger signal in case of the communication signal being not provided. The controller is connected to the detect unit to receive the trigger signal and control the warning component to perform an action.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
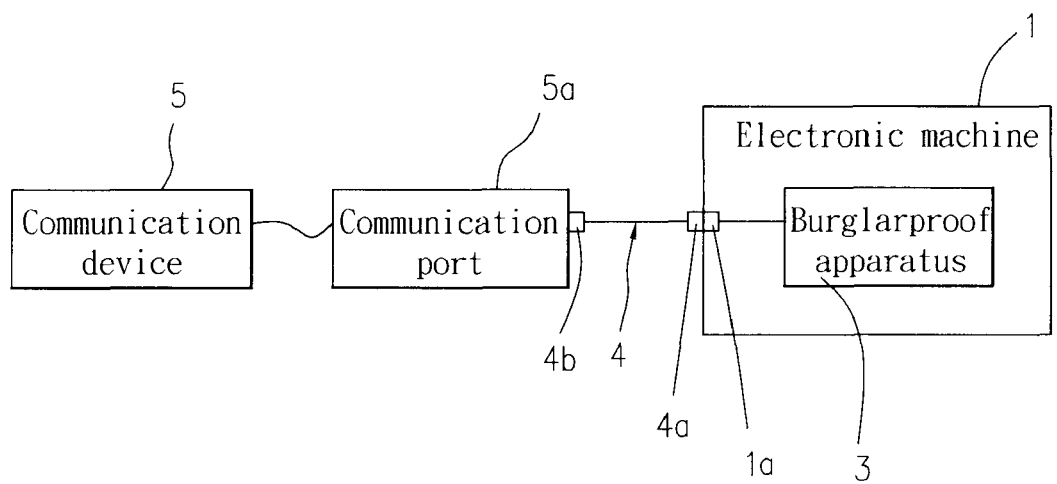
FIG. 1 is a block diagram illustrating operation of a burglarproof apparatus for an electronic machine according to the present invention.
Figure 2:
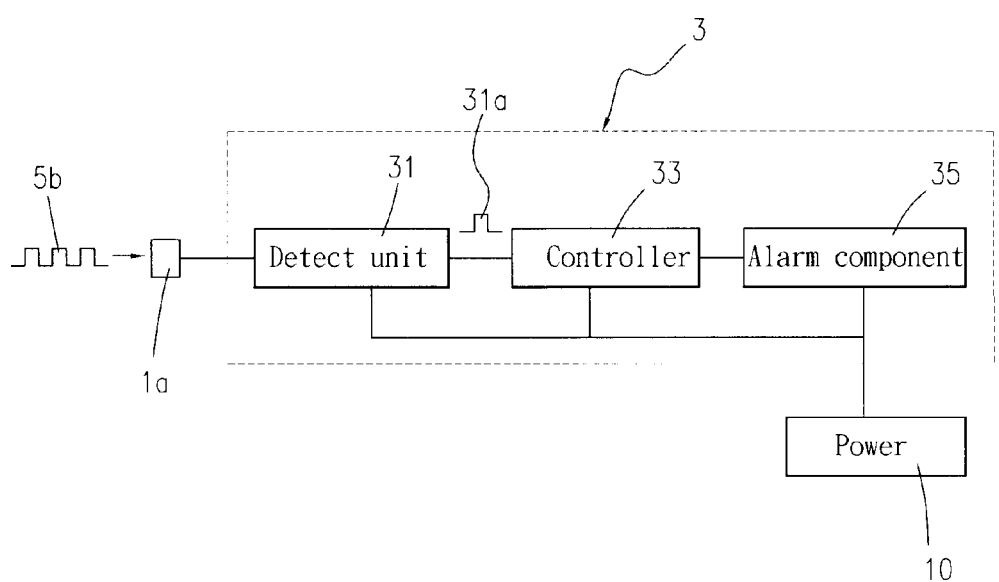
FIG. 2 is a block diagram illustrating a circuit structure employed with a burglarproof apparatus for an electronic machine according to the present invention.

Referring to FIGS. 1 and 2, the operation and the circuit structure of a burglarproof apparatus for an electronic machine according to the present invention are illustrated. An electronic machine 1, which, for instance, is a laptop computer, provides a burglarproof apparatus 3 and the electronic machine 1 has a built-in communication port 1a such as a RJ45 network port or a fiber-optic network connecting port. It is noted that the laptop computer is only for taking as an example and not for limiting application of the electronic machine 1. By the same token, the RJ45 network port and the fiber-optic network port are only for taking examples too and not for limiting the types of the communication port 1a.

The burglarproof apparatus 3 of the present invention is built in the electronic machine 1 such that function of burglarproof can be added to electronic machine 1. The burglarproof function can be set up completely by with a communication cable 1 being plugged to the electronic machine 1 with a connector 4a at an end thereof and being plugged to a communication device 5 with another connector 4b at another end thereof.

Figure 3:
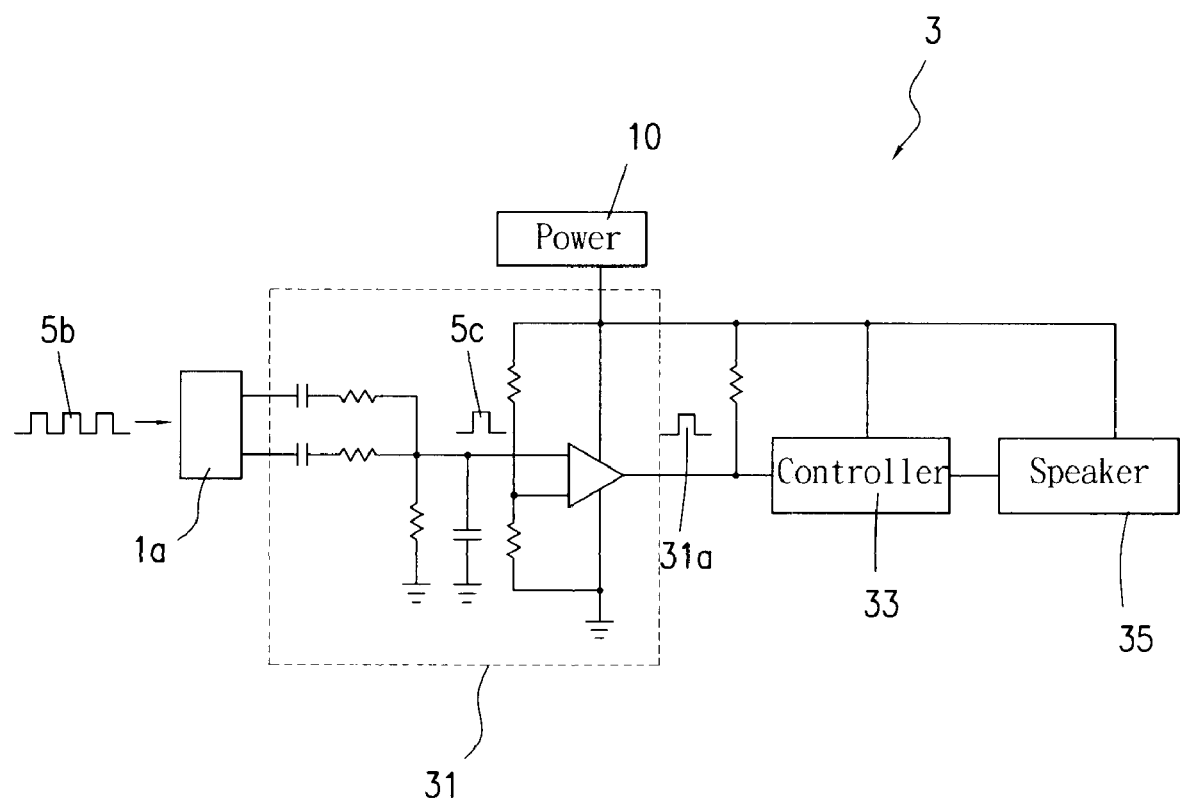
FIG. 3 is an implemented circuit diagram of burglarproof apparatus for an electronic machine according to the present invention.

Referring to FIG. 3, an implemented circuit structure of the burglarproof apparatus according to the present invention is illustrated. The burglarproof apparatus 3 includes a detect unit 31, a controller 33 and an alarm component 35. The detect unit 31 has an input end connects with the communication port 1a via the communication cable 4 for detecting if the communication signal 5b is available at the communication port 1a. In case of the communication signal 5b being not available at the communication port 1a, the detect unit 31 outputs trigger signal 31a. The communication signal 5b is output by a communication device 5. Taking the Ethernet associated with the burglarproof apparatus as an example, it can be seen that the detect unit 31 is a voltage comparator to detect if communication signal 5c is greater than a threshold voltage. Once it is true, the trigger signal 31a is incapable being output. Once it is false, the trigger signal 31a is capable of being output. The preceding communication signal 5b can be AN-Auto Negotiation signal of the Ethernet or ARP-Address Resolution Protocol signal. The communication signal 5c corresponds to the communication signal 5b.

In case of the trigger signal 31a being created, it means one of the connectors 4a, 4b of the communication cable 4 is removed from one of the communication ports 1a, 5a corresponding to it. For instance, a warning component such as a loudspeaker emitting extremely loud sound or a real person voice is emitted with the burglar apparatus 3 immediately at the time of a thief pulling out the connector 4a of the communication cable 4 from the communication port 1a of the electronic machine 1.

The controller 33 is connected to the detect unit 31 to receive the trigger signal 31a and control the warning component 35. When the controller 33 receives the trigger signal 31a, a signal is output immediately to allow the loudspeaker 35 to emit the warning sound. The controller 33 can be a controller already built in the electronic machine 1. For example, the controller 33 can be a keyboard controller component in the laptop computer 1. The light emitting diode (LED) can be employed as the warning component 35 except the loudspeaker.

Figure 4:
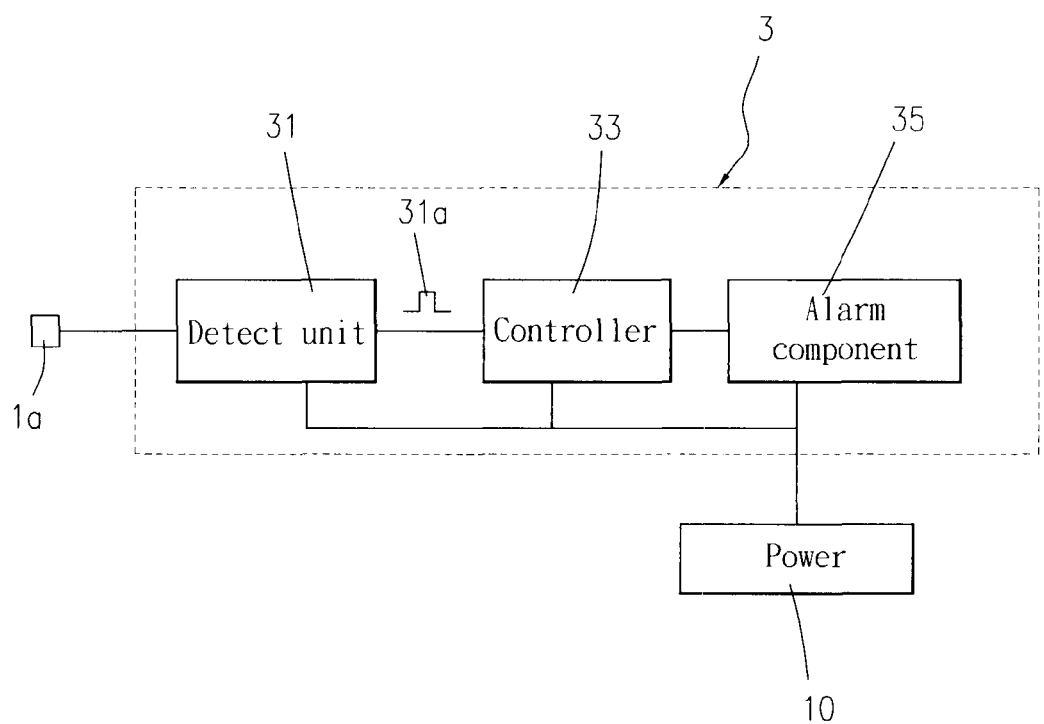
FIG. 4 is a block diagram similar to FIG. 2 to illustrate another circuit structure employed with a burglarproof apparatus for an electronic machine according to the present invention.

Referring to FIG. 4, another implemented circuit structure of the burglarproof apparatus according to the present invention is illustrated. The burglarproof apparatus 3 of the present invention provides an optical coupling detect unit 31 instead to comply with the communication port 1a being a fiber-optic network connecting port. The conventional art can be used for the optical coupling unit 31 directly.

The preceding communication device 5 is referred as a communication device, which has been arranged already at any places such as offices, plants and laboratories. The communication device 5 can be Ethernet communication device, fiber-optic communication device or the like. The communication port 5a can be such as an Ethernet receptacle mounted to a wall of a laboratory.

Figure 5:
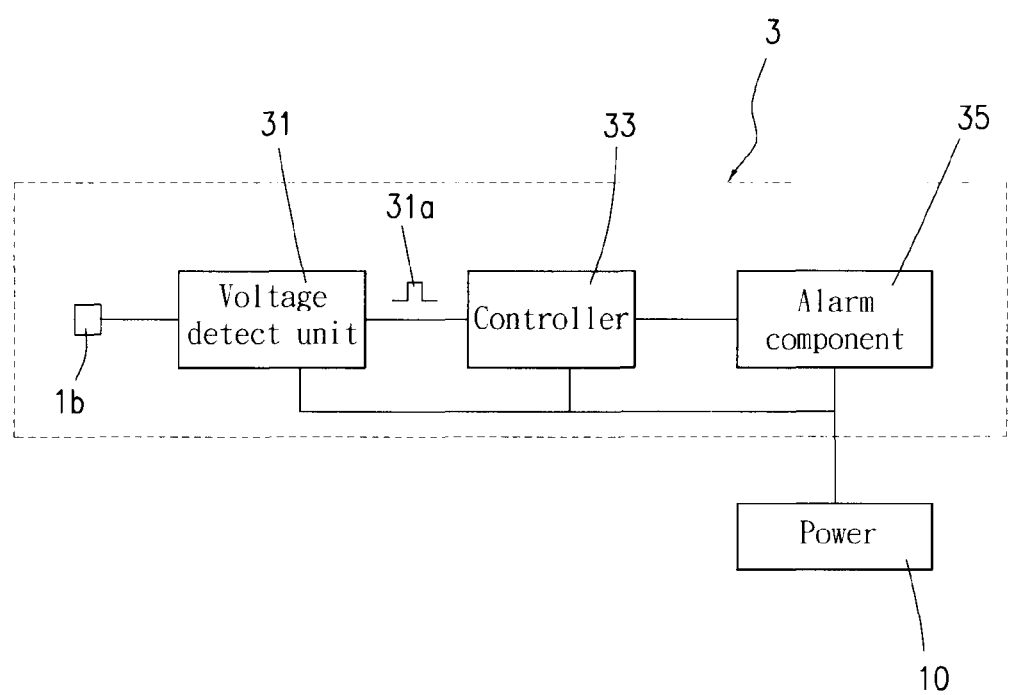
FIG. 5 is a block diagram similar to FIG. 4 to illustrate a further circuit structure employed with a burglarproof apparatus for an electronic machine according to the present invention.

Referring to FIG. 5, a further implemented circuit structure of the burglarproof apparatus according to the present invention is illustrated. A power receptacle 1b is built in the electronic machine 1 to connect with the power source outlet (e.g. 110V alternate current outlet) via both ends of an electric wire (not shown) connecting with the power receptacle 1b and the power source outlet respectively. The voltage detect unit 31 is used for detecting if voltage of the power source is available at the power receptacle 1b. Once no voltage of the power source is detected at the power receptacle 1b, a trigger signal 31a is output. The conventional art can be applied for the voltage detect unit 31 directly.

The power 10 for the burglarproof apparatus 3 is the power used by the electronic machine 1. That is, the power 10 is from the chargeable lithium battery for the laptop computer 1 or from AC to DC adapter.

Further, standby power 10 of the electronic machine 1 can be supplied to the burglarproof apparatus 3 such that, under this circumstance the burglarproof apparatus 3 is capable of keeping in a state of alert for carrying out task of anti-burglary in spite of the electronic machine being shut off.

In addition, the power 10 for the burglarproof apparatus 3 can be a dedicated power independent of the power for the electronic machine 1. The dedicated power can be from a battery or a battery built in the electronic machine 1 and being not detached from the electronic machine 1 easily.

Figure 6:
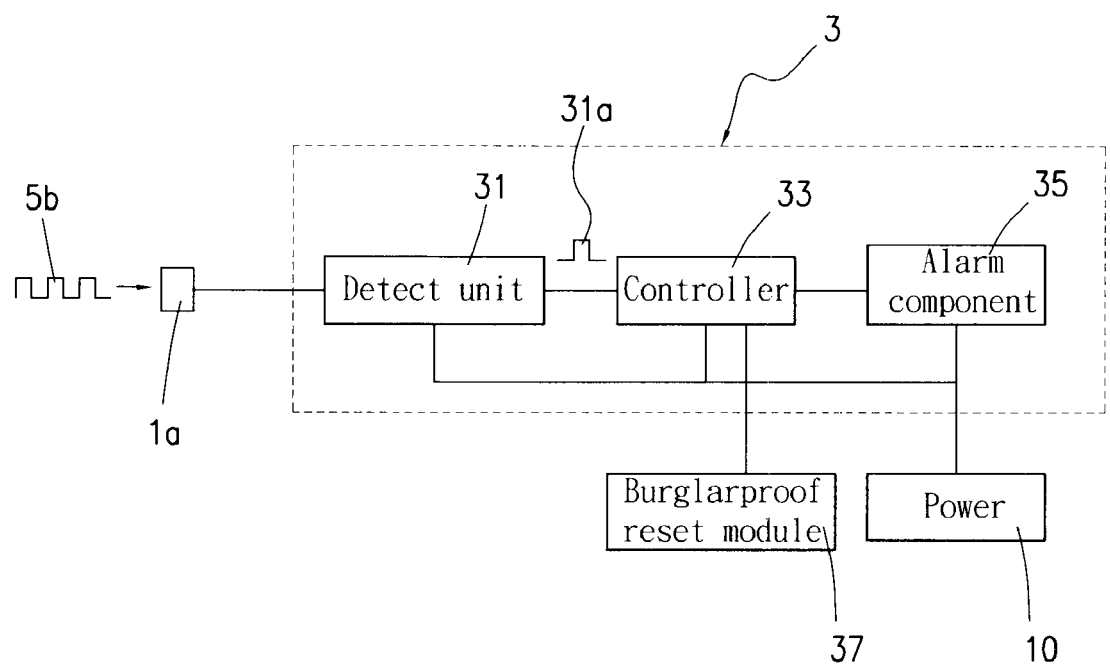
FIG. 6 is a block diagram similar to FIG. 5 to illustrate a further circuit structure employed with a burglarproof apparatus for an electronic machine according to the present invention in which a burglarproof reset module is added.
Figure 7A:
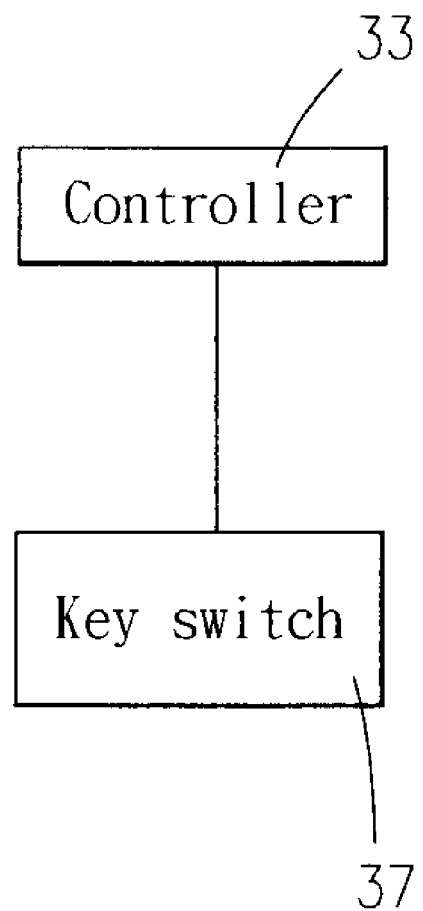
FIG. 7A is a block diagram illustrating an embodiment to implement the burglarproof reset module of the present invention.

Referring to FIG. 6, a circuit structure with a burglarproof reset module 37 for the burglarproof apparatus of the invention is illustrated. The burglarproof reset module 37 is capable of resetting status of the burglarproof apparatus 3 being alert or disarming. It can be seen in FIG. 7A that the burglarproof reset module 37 is embodied to provide at least a key switch such as a built-in keyboard of the electronic machine 1 and the controller 33 is capable of receiving signal from the key switch 37 and resetting the status of the burglarproof apparatus 3.

Figure 7B:
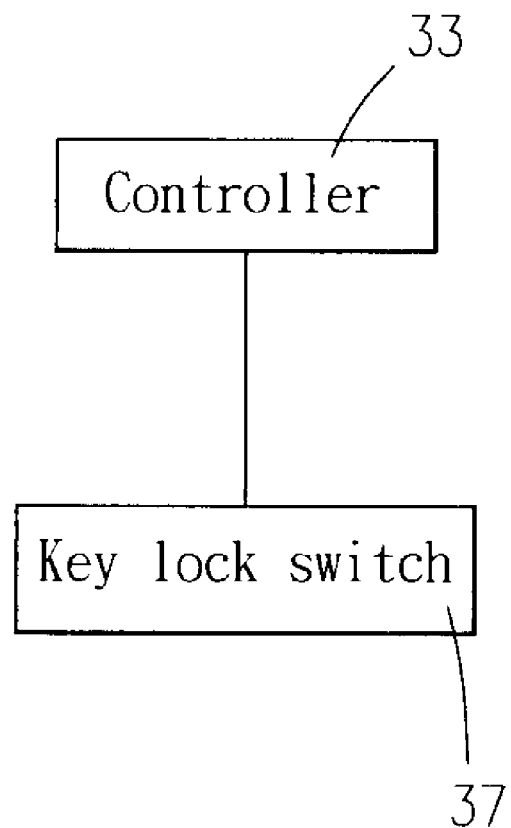
FIG. 7B is a block diagram illustrating another embodiment to implement the burglarproof reset module of the present invention.

Next, Referring to FIG. 7B, the burglarproof reset module 37 is embodied to provide a key lock switch and the controller 33 is capable of receiving signal from the key lock switch to reset the status of the burglarproof apparatus 3.

It is appreciated that the burglarproof apparatus for an electronic machine according to the present invention has promoted additive value of the electronic machine for frightening stealers and preventing losses from the burglarious behavior effectively.

While the invention has been described with referencing to preferred embodiments thereof, it is to be understood that modifications or variations may be easily made without departing from the spirit of this invention, which is defined by the appended claims.

What is claimed is:

1. A burglarproof apparatus, which is built in an electronic machine with a communication port being electrically connected to an end of a communication cable and another end of the communication cable being connected to a communication device, comprising:
    a detect unit being connected to the communication port via the communication cable for detecting if a communication signal, which is output by the communication device, is available at the communication port, and outputting a trigger signal in case of the communication signal being not available;
    a controller being connected to the detect unit to receive the trigger signal; and
    an alarm component being controlled by the controller to perform an action.

2. The burglarproof apparatus as defined in claim 1, wherein the communication port is a network connecting port.

3. The burglarproof apparatus as defined in claim 2, wherein the network connecting port is a RJ45 network connecting port.

4. The burglarproof apparatus as defined in claim 2, wherein the network connecting port is a fiber-optic connecting port.

5. The burglarproof apparatus as defined in claim 1 wherein the alarm component is a loudspeaker.

6. The burglarproof apparatus as defined in claim 1, wherein the alarm component is a light emitting diode.

7. The burglarproof apparatus as defined in claim 1, wherein the detect unit, the controller and the alarm component are connected to a power source respectively.

8. The burglarproof apparatus as defined in claim 1, wherein the electronic machine is a laptop computer.

9. The burglarproof apparatus as defined in claim 1 further comprises a burglarproof reset module, which is connected to the controller, to reset a status of alert or disarming.

10. The burglarproof apparatus as defined in claim 9, wherein the burglar reset module is at least a button key switch.

11. The burglarproof apparatus as defined in claim 9, wherein the burglar reset module is key lock switch.

* * * * *